United States Patent [19]

Burkel et al.

[11] Patent Number: 4,554,528

[45] Date of Patent: Nov. 19, 1985

[54] VEHICLE TIRE PRESSURE MONITORING SYSTEM

[75] Inventors: Rainer Burkel, Asperg; Cornelius Peter, Stuttgart, both of Fed. Rep. of Germany

[73] Assignee: Robert Bosch GmbH, Stuttgart, Fed. Rep. of Germany

[21] Appl. No.: 525,724

[22] Filed: Aug. 23, 1983

[30] Foreign Application Priority Data

Sep. 4, 1982 [DE] Fed. Rep. of Germany ....... 3232919

[51] Int. Cl.$^4$ ............................................ B60C 23/02
[52] U.S. Cl. ...................................... 340/58; 73/146.5
[58] Field of Search ................ 340/58, 52 F; 73/146.5

[56] References Cited

U.S. PATENT DOCUMENTS

| | | | |
|---|---|---|---|
| 3,711,827 | 1/1973 | Houseman | 340/52 F X |
| 4,057,783 | 11/1977 | Blanchier | 340/58 |
| 4,064,482 | 12/1977 | Maisch et al. | 340/58 |
| 4,119,944 | 10/1978 | Smith | 340/58 |
| 4,130,817 | 12/1978 | Hill et al. | 340/58 |
| 4,148,008 | 4/1979 | Lusk et al. | 340/58 |
| 4,186,377 | 1/1980 | Barabino | 340/58 |
| 4,272,755 | 6/1981 | Broetto | 340/58 |
| 4,319,220 | 3/1982 | Pappas et al. | 340/58 |

FOREIGN PATENT DOCUMENTS 2549946 5/1977 Fed. Rep. of Germany .
2009061 5/1979 United Kingdom ................ 340/58

*Primary Examiner*—John W. Caldwell, Sr.
*Assistant Examiner*—Ellwood G. Harding
*Attorney, Agent, or Firm*—Frishauf, Holtz, Goodman & Woodward

[57] ABSTRACT

The respective wheels of a vehicle have transducers (11, 12) associated therewith which provide pulse trains (S1, S2) upon revolution of the wheels, the pulses being either "mark" pulses if the transducer senses "correct pressure", or "space" pulses if the transducer senses "low pressure". The pulses from all the transducers are logically combined in a NOR-gate (23), and the output is connected via a common junction (J) to the count or shift inputs of a group of shift registers (22). The shift registers are individually reset by the pulses from the individual transducers. Thus, if one of the transducers signals "low pressure" conditions, the particular shift register (22) will not be reset, and, upon shifting through to its terminal count, will provide respective output signals to individually connected indicators (27). All the indicators are connected to a common, particularly acoustic warning signal indicator (19), and a test timing circuit (T, 31) is provided, enabled upon turning ON the main switch of the vehicle to provide a test cycle and a test warning output.

11 Claims, 3 Drawing Figures

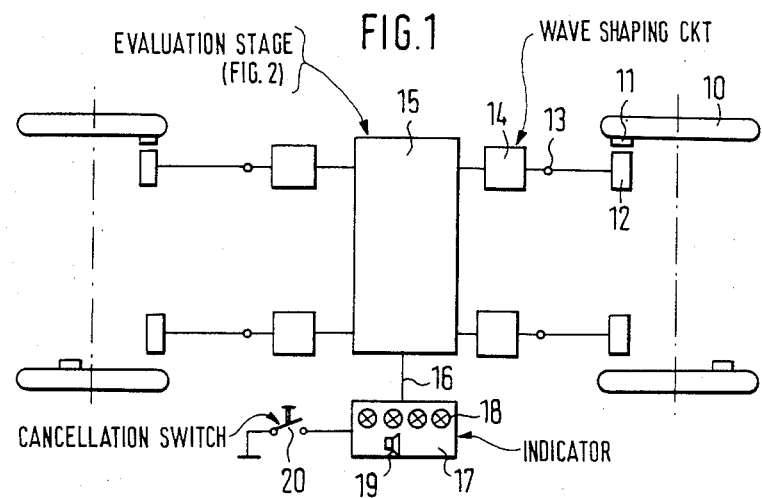
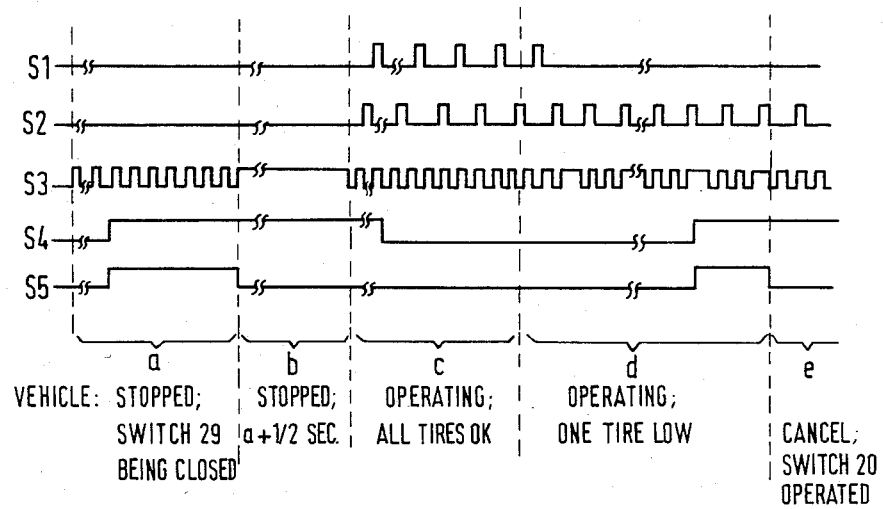

VEHICLE TIRE PRESSURE MONITORING SYSTEM

Reference to related patent, the disclosure of which is hereby incorporated by reference, assigned to assignee of the present invention: U.S. Pat. No. 4,064,482, MAISCH et al.

The present invention relates to a system to supervise tire pressure in inflated tires of a vehicle and to provide an output indication to the vehicle operator if the pressure in one or more of the tires of the vehicle drops below a predetermined level.

BACKGROUND

It has previously been proposed—see the referenced U.S. Pat. No. 4,064,482, assigned to the assignee of the present application, the disclosure of which is hereby incorporated by reference, to provide inductive transducers located adjacent the wheels of the vehicle, which pick up signals from the tires of the vehicle representative of individual tire pressure, and to transmit the signals, via a wave-shaping circuit, to a shift register. The system is so arranged that the shift register which receives the signals from a transducer of one vehicle wheel is reset by signals received from a transducer of another vehicle wheel, for example at the side opposite to the first, so that the pulse train derived from the respective transducers of oppositely located wheels are compared. If a limiting value for the tire pressure in one side is reached, no signals are transmitted to the associated shift register which, then, is no longer reset and is loaded, rather, by the signals from the opposite wheel. After a few revolutions, the shift register will be full and provide an overflow signal which is connected to an alarm circuit providing an alarm output indication, for example by energizing a warning lamp, that the respective shift register is full, thus indicating incorrect tire pressure of one of the wheels.

The warning light, or other warning indication, provides an output indicating that something is amiss. It does not, however, provide an output indication which one of the vehicle wheels has air pressure which is too low. Due to the comparison of signals from various wheels, no warning indication will be provided if, for example, two oppositely located wheels lose pressure essentially simultaneously, which, for example, may be the case if the vehicle tires are damaged by running over a sharp cross bar, or the like.

THE INVENTION

It is an object to improve a tire pressure sensing system which provides warning output signals even if oppositely located vehicle wheels simultaneously lose air pressure beyond a predetermined value, and which permits providing output indications in which an indication of which tire has lost pressure is also available.

Briefly, a combining logic circuit is provided connected to the transducers associated with the wheels to receive signal trains, for example after wave-shaping, and providing combined output signals; each one of the wheels has associated therewith a shift register, which shift registers from all the wheels are connected to a combining logic circuit, the transducers being connected to the respective reset terminals of the associated shift register and connected to reset the shift register if the transducer provides a "correct pressure" signal, but, if the specific transducer provides a "low pressure" signal, the shift register will continue to shift until fully loaded condition, thereby indicating that the tire with which the specific shift register is associated, has a low pressure. The output signals of all the shift registers are combined to provide a combined output signal of "incorrect tire pressure" to provide the shifting signals for all the shift registers so that, reliably, all the shift registers will be loaded since it can be assumed that at least one of the tires will retain its tire pressure; simultaneous failure of tire pressure in all tires would surely be noticed by the driver due to the steering behavior of the vehicle. To obtain a specific output of which tire has a low pressure, individual outputs from the respective shift registers are obtained. Also, a combined output from all the shift registers can be obtained to provide, for example, an audible alarm to alert the vehicle operator that the tire low-pressure indicator should be observed and checked.

The system has the advantage that supervision of vehicle pressure is fully effective as long as only one of the tires of the vehicle has sufficient air pressure. Due to use of comparatively high capacity shift registers, false warning signals which may occur due to uneven loading on the tires, for example upon parking the vehicle in constricted parking slots, are effectively provided.

In accordance with a preferred embodiment, which is particularly desirable, the shift registers are connected with their outputs over a memory stage to a warning indicator. Any failure of normal tire pressure is then stored. Preferably, the shift registers are constructed in the form of counters which are readily available as integrated circuits. The count number or count state at which an overflow signal is provided can then easily be matched to particular types of vehicles, with respective tire pressures or other characteristics, so that one mass produced system is readily available for association with various and different types of vehicles.

DRAWINGS

FIG. 1 is a schematic block circuit diagram of the system arranged for a four-wheel vehicle; of course, it is applicable to multi-wheel vehicles as well, and can easily be expanded to cover all wheels of, for example, a tractor-trailer combination;

FIG. 3 is a timing pulse diagram illustrating the signals which arise at various points within the system.

DETAILED DESCRIPTION

Figure 2:
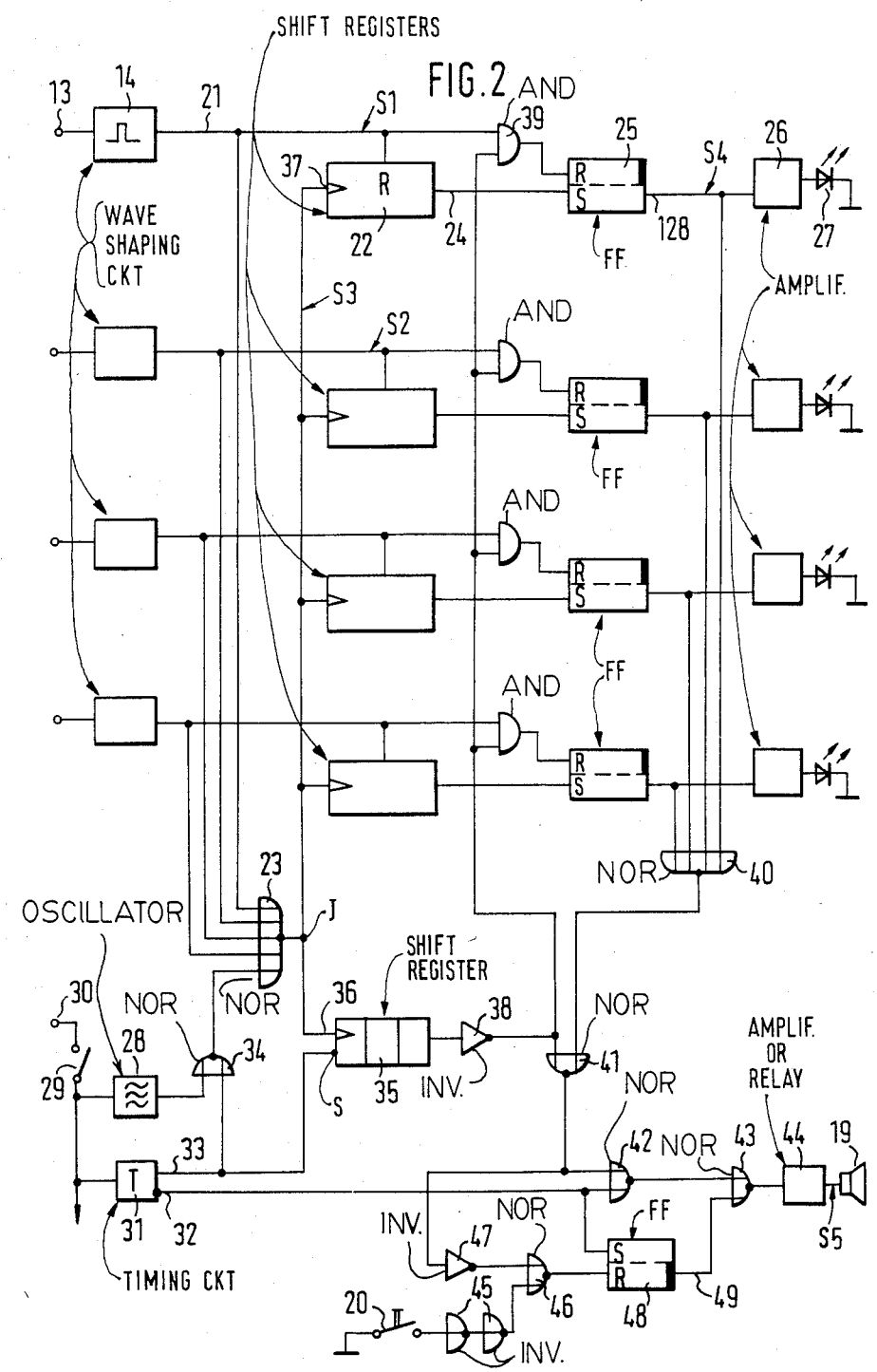
FIG. 2 is a detailed block circuit diagram of the evaluation circuit of the signals derived from the individual transducers, in which circuit elements are labelled in accordance with their function.

Each vehicle wheel 10 has an inductive transducer 11 associated therewith. Such transducers are known and, for example, include a resonance circuit on the vehicle wheel which, when the tire pressure drops, is either open-circuited or short-circuited, in other words, in which the resonance conditions of the resonance circuit change in dependence on tire pressure above and below a predetermined level. The inductive transducers 11, upon each revolution of the vehicle wheel, pass by a fixed transducer pick-up 12 which, likewise, is formed as a resonance circuit, for example having the same resonance frequency of the associated inductive transducer 11. The pickups 12 are connected to terminals 13 which, in turn, are connected to a wave-shaping circuit 14 and to an evaluation circuit 15. The evaluation circuit 15 is connected through an output line 16 to a warning indicator 17. The warning indicator 17 includes optical indicators 18, one each associated with a respective vehicle wheel, and a common indicator 19, shown in the example as an acoustic output indicator, such as a buzzer, speaker, or the like. A cancellation key 20 is connected to the indicator 17.

The evaluation stage 15, and its connection to the indicator 17, is shown in detail in FIG. 2, to which reference is now made. The wave-shaping circuits 14, connected to terminals 13 and each to a transducer pick-up 12, are connected with their outputs 21 to the reset input R of an associated counter 22, operating in form of a shift register. The signal inputs 37 of the shift registers are connected to respectively parallel connected outputs of a first NOR-gate 23. The individual evaluation systems connected to the respective wheels are identical, and only one of them will be described in al detail, and has been given reference numerals in the drawings for simplicity and ease of analysis. The four inputs of the NOR-gate 23 are connected, respectively, to one of the outputs 21 of the wave-shaping circuits 14.

The outputs 24 from the counters 22 are connected to the SET input of a respective flip-flop (FF) 25, forming a memory circuit, which has its output connected to the warning indicator which, in the system shown, includes a switching stage 26, for example an amplifier responding to a certain output level at the terminal 128 of the FF 25, and supplying operating energy to a light-emitting diode (LED) 27.

In accordance with a feature of the invention, a test system for the arrangement is provided which, at the beginning of any trip and upon energization of the main vehicle switch, provides a test output that the system is operating properly. The main vehicle switch 29 which, for example, may be the ignition switch or the ON-/OFF switch of the vehicle having a Diesel engine, upon energization at terminal 30 from the on-board network of the vehicle, provides output to an oscillator 28 and, further, energizes a timing circuit 31. The timing circuit 31, for example, may be a monostable FF, which is connected, together with the output from oscillator 28, to an input of a second NOR-gate 34. The FF 31 has a direct output 33, which is connected to the NOR-gate 34, and an indirect or inverting output 32. The output of the second NOR-gate 34 is connected to an additional input of the first NOR-gate 23. The direct output 33 of the timing circuit 31 is, additionally, connected to the signal input of a further and separate shift register 35. Shift register 35 has a gating or shifting input 36 which is connected to the output of the NOR-gate 23, that is, to a common junction J thereof. This common junction is thus connected to the shifting or counting inputs of the shift registers or counters 22 as well as to the shifting or counting input of the further shift register 35 which, likewise, may be constructed in form of a counter.

The output of the shift register 35 is connected through an inverter 38 with the reset inputs of the FFs 25 through individual respective AND-gates 39. The second input to the AND-gates 39 is connected to the terminal 21 which forms the output from the respective wave-shaping circuit 14. Thus, the outputs 21 of the wave-shaping circuits 14 are connected through the respective AND-gates to the output of the shift register 35—with inversion—and are connected through the respective AND-gates to the respective RESET inputs R of the associated FFs 25. The outputs 28 of the respective FFs are, additionally, connected to the input of a NOR-gate 40 to provide, through additional logic gates, a common output to an audible indicator 19.

A suitable audible indicator 19 comprises a buzzer which is enabled through a control logic when one of the FFs is enabled. It can be disconnected by the timing circuit 31 and, additionally, by the cancellation switch 20. The outputs from the FFs 25, that is, their terminals 28, are connected through the NOR-gate 40 which, in turn, has its output connected to the output of the shift register 35 through the inverter 38 by a further NOR-gate 41. The output of the NOR-gate 41 is connected to one input of an additional NOR-gate 42 which, also, receives the output from the inverting terminal 32 of the timing circuit 31 as a further input. The output from NOR-gate 42 is connected to one input of a further NOR-gate 43, and then, from the output of NOR-gate 43, through an amplifier or other switching or relay circuit, which may be an electronic or mechanical relay, and shown as block 44, to the buzzer 19.

The cancellation switch 20 is connected through two serially connected inverters 45, forming buffer or isolation circuits, to one input of a further NOR-gate 46, the second input of which is connected through an inverter 47 to the output from the NOR-gate 41 and, hence, as a further input, to the NOR-gate 42. The output from NOR-gate 46 is connected to the RESET input of an FF 48, which has its SET input connected to the inverting output 32 of timing circuit 31. The inverting output 49 of FF 48 is connected as a second input to the NOR-gate 43.

Operation, with reference to FIG. 3: FIG. 3 shows, in a series of superimposed and aligned graphs, signals arising within the circuit. The signal designation S1 ... S5 is also entered in FIG. 2, so that the occurrence of the signals within the circuit of FIG. 2 can be easily seen, and associated with the diagram of FIG. 3.

FIG. 3 shows signals in five time periods a to e. In the diagram, time period a is shown for the vehicle being stopped, and energization power being applied upon closing of switch 29. The respective vehicle conditions are shown in FIG. 3. In time period b, the vehicle is still stopped and time has elapsed after energization, for example longer than about half a second. Time period c shows signals during operation of the vehicle with all tires having suitable pressure. Time period d shows the signals during operation if one of the tires has low pressure; and time period e shows the signals after operation of the cancellation switch 20.

The signals at output 21 from the wave-shaping circuit 14 associated with a first wheel, for example the left front wheel, are shown at S1. This wheel will, during the time period d, lose pressure. The signals S2 show the signals on the output lines 14 from one or more of the other tires, for example the right front, and right and left rear wheels, which—throughout the operation—have proper tire pressure. The signals S1, S2, thus, are wave-shaped signals derived from the inductive transducers 11/12 of the respective wheels. Signal S3 shows the signals at the common junction J and applied to the signal or counting inputs 37 of the counters 22. Signal S4 is the signal at the input of the respective switching stages or amplifiers 26 which energize the respective LEDs 27, associated with the specific wheel, and, in FIG. 3, the signal S4 shows that signal which is applied to the LED 27 associated with the wheel which will have low pressure. S5 shows the signal at the input of the audible warning element or buzzer 19 which, of course, also corresponds to the output of the amplifier or relay or switching stage 44.

Let it be assumed, first, that the main switch 29 is being closed. Oscillator 28 will be energized, and the timing circuit 31 will start a timing interval. Oscillator 28, for example, provides an output frequency in the order of about 10 kHz. A corresponding signal train is then applied during the time period a via the NOR-gate 34 to the NOR-gate 23, and from there on to the signal inputs 37 of the counters 22. An additional input will be applied to the clock input 36 of the shift register 35. No signals are applied to the input terminals 13 of the wave-shaping circuit 14, since, as previously explained, during time period a, the vehicle is stationary.

The signal input of the shift register 35 will, initially, have a 0-signal from the output 33 of the timing circuit 31 and, upon occurrence of the clock pulses S3, the 0-signal is read into the shift register 35. Let is be assumed that the shift register 35, for example, has forty stages. After forty stages, the 0-signal, thus, will appear at the output of the shift register 35 and, after inversion in the inverter 38, is applied as a 1-signal to the input of the AND-gates 39 as well as to the input of the NOR-gate 41. Simultaneously, the signal train is read into the respective counters 22. Counters 22 may, for example, have a count number of 64. After 64 S3 signals, outputs 24 of the counters 22 will provide a 1-signal, which causes the respective FFs 25 to be SET. The 1-signal S4 at the output of the respective FFs switches the respective LEDs 27 through the respective amplifiers or switching stages 26, thus providing an output indication on all the LEDs. Simultaneously, the signals S4 are applied through the NOR-gate 40 to the second input of the NOR-gate 41 which carries a 1-signal from the output of the inverter stage 38, as described above. The 1-signal, due to the inverting input from the terminal 32 of timing circuit 31, is transmitted through NOR-gate 42 to the input of the NOR-gate 43, now inverted as a 0-signal. The inverting output 32 of the timing circuit 31, with its 1-signal also sets the FF 48 so that the second input of the NOR-gate 43, connected to the inverting output of the FF 48, likewise has a 0-signal. The amplifier or relay 44 will, thus, receive from the output of NOR-gate 43 a 1-signal S5 which is applied to the audible indicator 19, thus providing an acoustic signal.

This phase is a test phase, assuring the operator that all the LEDs 27 are operating, that the tone generator 19 is operating, and that the respective shift registers 22 all shift, and the gating and FF circuits 39, 25 are operating properly.

After elapse of the test time, for example about ½ second, the polarity of the signals at outputs 32 and 33 of the timing circuit 31 are reversed. The inverting circuit 32 now will have a 0-signal, and the output 33 will have a 1-signal which is applied to the NOR-gate 34 and, then, will block the output from oscillator 28. The shift register 35 will remain in the condition it previously was in upon blocking of the enabling or shifting input S thereto. The timing circuit 31, it should be noted, includes inherent inversion function, that is, upon enabling, the outputs 33, 32, respectively, carry 0-signals and 1-signals, and upon elapse of the timing period, the outputs 33, 32 carry 1-signals and 0-signals. Upon termination of shifting through the shift register 35, the two inputs of the NOR-gate 42 will have 0-signals, which appear as 1-signals at the output thereof being applied to the NOR-gate 43, thus disabling the audible output indicator 19 after about ½ second, that is, the elapse of the timing period of the timing circuit 31. The LEDs 27 remain connected.

Let it then be assumed that the vehicle is started and begins to move, time period c. Respectively shifter signals are derived from the respective inductive transducers 11, 12 to the respective wave-shaping circuits 14 and there applied to the RESET inputs R of the respective counters 22, see signals S1, S2, FIG. 3. At the same time, the respectively shifted signals are applied via the NOR-gate 23 as common signal S3 appearing at the junction J, and applied as count inputs to the count or signal inputs 37 of the four shift registers or counters 22. Further, the signals are applied to the clock input 36 of the shift register 35.

The first signal from the transducer 11 will cause the associated counter 22 to be reset; the corresponding AND-gate 39 then RESETS the connected FF 25. The output 28 of the FF 25 will have a 0-signal S4 thereon, and the amplifier 26 will be disabled, thus extinguishing the LED 27, see signal S4.

In corresponding manner, the remaining transducers 11/12 will cause the respective counters 22 to RESET, causing in turn RESET of the FFs 25 and disconnection of the associated LEDs 27.

It may occur that not all the LEDs will extinguish after the first revolution of the respective wheels 10. If so, the register 35 blocks RESET of the FFs 25. As soon as forty S3 signals are applied via the NOR-gate 23 from the transducers 11 to the clock input 36 of the register 35, and, via the inverter 38, are transformed into a 0-signal, 0-signals are applied to all the AND-gates 39. This prevents RESET of the respective FF 25, and the light output from the respective LED 27 of the FF 25 which has not yet been RESET will remain lit.

This, then, indicates either low pressure or malfunction of the respective transducer circuit or trouble in the signal chain connected thereto.

Let it be assumed that one of the tires, for example the left front tire which provides the signals S1, loses pressure below a predetermined limit during operation of the vehicle, time period d. Upon loss of pressure, the respective transducer 11/12 will no longer provide signal trains. In the example selected, the upper terminal 13 will no longer have signal trains applied during the time period d. The associated couner 22 thus no longer will be RESET, after having been enabled and set through the signals from the other tires applied at the junction J. Gaps will occur in the signal train S3 at the output of the NOR-gate 23 at junction J. The signals of the three other transducers 11/12 are transferred through the NOR-gate 23 to the junction J and, after sixty-four revolutions, the counter 22 will be full and provide an output overflow signal at output 24 in the form of a 1-signal, which causes the subsequently connected FF 25 to be SET. The output signal S4 of the FF 25 causes the associated LED 27 to be connected—assuming that it has been previously extinguished—and low pressure of the respective tire is thereby signaled. Simultaneously, NOR-gate 40 will provide an inverted output from signal S4, which is combined with the 0-signal of the inverter stage 38 in NOR-gate 41 to form a 1-signal which is connected through the NOR-gate 42 in form of a 0-signal, again inverted in the NOR-gate 43 and combined with the output from FF 48 into a 1-signal, enabling the amplifier or switching stage 44 and thus providing an audible signal at audible indicator 19.

If a further vehicle tire 10 should lose pressure below a predetermined value, associated LEDs 27 are simultaneously connected, additionally and also enabling the audible indicator 19.

Erroneous indication is prevented in this manner: It may occur that the air pressure in one of the vehicles 10 is at about the lower limit. It is possible, thus, that single signals S1 from the transducers 11/12 will be missing but other signals will be provided, due to instantaneous variations in air pressure, for example due to heating effects and the like. Likewise, upon parking the vehicle or moving into tight spaces, one signal transducer 11 may provide substantially fewer signals than the others, due to differences in individual wheel speeds. Failure to receive one or more signals is eliminated by the respective counters 22 by providing an output signal only after the counters 22 have counted through their respective count stages, for example sixty-four count stages, so that an output signal S4 will occur only after sixty-four input signals S3 unless, before sixty-four S3 signals are received, a further signal S1 is received from the associated transducer 11/12, which again RESETS or CLEARS the associated register 22.

To prevent audible annoyance, the cancellation switch 20 can be used to disconnect the audible indicator 19 if, for example, due to failure of receipt of a signal from the respective transducer 11, it was enabled by a signal applied to an LED 27, as described in connection with the operation during time period d. In that case, see time period e, a 0-signal is applied by the switch 20 which grounds, through the respective inverters 45, the second input to the NOR-gate 46, and there logically combined with a 0-signal from the output of the inverter stage 47. The 0-signal at the output of the inverter 47 will appear if one of the tires 10 has low pressure. The NOR-gate 40 will provide a 0-signal which is applied through the NOR-gate 41 and appears as a 1-signal at the inverter 47. The output of the NOR-gate 46 will thus provide a 1-signal through which the FF 48 is RESET. The inverting output of the FF 48 thus will have a 1-signal which is applied over the NOR-gate 43 as a 0-signal to the amplifier or relay or switching stage 44, thus disconnecting the audible output indicator 19.

Various changes and modifications may be made, and the invention is not limited to the example described, since other logical connecting circuits may be used in order to control the acoustic or optical signals. The important feature, however, is to associate with each vehicle wheel a shift register or counter which is loaded by all the signal outputs from all the transducers over a logic circuit and which is RESET by the signal train from the associated transducer, however. The registers or counters thus are utilized as signaling buffers for erroneous output indications, or outputs which are not indicative of low tire pressure, but, rather, of other operating conditions. It may, thus, occur that signals do not arise at terminals 13 if the vehicle passes through a tight curve, upon parking the vehicle, placing it into tight slots, or other maneuvers, in which one wheel may rotate substantially faster than another one and, although the vehicle may be moving, one or more of the wheels may remain essentially stationary. The registers or counters 22 additionally filter out high-frequency and other disturbances, or operation if the tire pressure is not excessively low, but close to the limit of the preset pressure. The respective warning circuit as exemplified by the LEDs, will provide a warning indication only if the respective counter or register 22 has been loaded with a predetermined number of pulses—in the example selected sixty-four pulses—without having received a RESET pulse. Erroneous or spurious indication is thus prevented. The respective warning signal is stored in the FF 25, to maintain the respective indicator LED energized or enabled.

The respective registers 22, and counters 35, can be readily constructed as integrated circuit (IC) elements, for example on a single chip, and so selected that the count states or count numbers to which they respond—in the example selected sixty-four counts for the counters 22 and forty counts for the counter 35—are matched to operating and construction characteristics of particular vehicles. Thus, a single system can be used in which, by mere connection of the respective counters or shift registers to shift to respectively different numbers, matching of the system to different vehicles is easily accomplished. Likewise, the timing circuit 31 can be set for different timing by merely changing the timing constant thereof, for example by adjustment of an R/C circuit.

Various other changes and modifications may be made within the scope of the inventive concept.

A suitable counter 35 is HEF 4731 B (made by Volvo); a suitable IC for register 22 is CD 4020 made by National Semiconductor. A suitable integrated circuit for use in the system is 8748 by Intel.

We claim:

1. Vehicular tire pressure monitoring system for a plurality of wheels (10) to be monitored, having
a plurality of pressure transducers (11, 12), one each being associated with a wheel of the vehicle and providing, respectively, "correct pressure" or "low pressure" signals upon each revolution of the respective wheel, said signals forming a plurality of signal trains (S1, S2) associated with the respective wheels;
a signal processing and evaluation network (15) having counters (22), each having a reset terminal, one each associated with a respective wheel;
and a plurality of warning indicators (26, 27), one each associated with a respective wheel and providing a warning indication of low tire pressure,
said system comprising
a combining logic circuit (23) including a NOR-function element (23), having its input connected to the outputs (21) of the transducers (11, 12) of all the wheels, in parallel, to receive the signal trains (S1, S2) of all the wheels, combine said signal trains, and provide combined output signals (S3);
a connection means (J) from said combining logic circuit, the output from the combining logic circuit being formed by said connection means (J) to form common junction which, in turn, is connected to the count inputs (37) of all of said counters (22);
means (13, 14) for connecting the respective transducers (11, 12) to the respective reset terminals (R) of the associated counters (22) to reset the respective counters when the transducer provides to the respective counters "correct pressure" signals, but failing to reset the respective counter upon providing "low pressure" signals;
means (24, 25, 28) for connecting the shift output of the respective counters to the respective associated indicators, shifting of the counters to fully loaded condition being indicated by the respective warning indicator (26, 27) to thereby provide a warning indication signal indicative of low pressure at the respective tire after the associated counter has been fully loaded by the combined output signals (S3)

derived from those transducers which have still provided "correct pressure" signal trains (S2); and an oscillator (28) energizeable by connection of a vehicle main switch (29), the output of the oscillator (28) being connected to a further input of said NOR-function element (23) to pretest the warning indicators (26, 27) and operability of the combining logic circuit (23), the connection means (J) from said combining logic circuit, the counters (22) and the connection means (24, 25, 28) connecting the shift output of the respective counters to the respective associated indicators.

2. System according to claim 1, wherein the connection means between the counters and the warning indicators include a memory stage (25).

3. System according to claim 1, further including a second NOR-function circuit (34) interconnected between the output of the oscillator (28) and said NOR-function element (23);

and a timing circuit (31) logically controlling conduction of the second NOR-function circuit for a limited period of time after energization of the oscillator (28) upon closing of the vehicle main switch (29).

4. System according to claim 3, further comprising an additional shift register (35) having a clock input (36) connected to said common junction (J) and hence receiving the signal trains (S1, S2) combined by said connection means and also applied to the data inputs of said shift registers (22).

5. System according to claim 4, further including a second logic circuit (38; 39) connecting the output of the additional shift register (35) to reset the memory (25) connected to the output of the respective counters (22) and cancel the stored information therein upon energization by the second logic circuit.

6. System according to claim 5, wherein said second logic circuit comprises an AND-function element (39) receiving outputs from the respective transducers (11, 12) and hence the respective signal trains therefrom;

said memory includes a flip-flop (25), the AND-function circuit logically combining the output from the additional shift register (35) and said signal trains (S1, S2) to RESET the respective memory flip-flop (25).

7. System according to claim 2, further including a common warning indicator (19) being energized upon energization of any one of said separate warning indicators (26, 27), associated with the respective vehicle wheels.

8. System according to claim 7, wherein the common warning indicator comprises an acoustic alarm indicator.

9. System according to claim 7, wherein said individual warning indicators (26, 27) are connected to the outputs of the respective memory stages, controlled by the counters (22) which, in turn, are associated with the respective wheels; and a third NOR-function element (40) is provided interconnecting the outputs of the memory stages (25) and coupled to a common warning indicator (19).

10. System according to claim 9, further including a timing circuit (T, 31) connected to be enabled upon closing of a main switch (29) of the vehicle and establishing a timing interval;

and logic connection means (40, 42) interconnecting the output of the timing circuit (31) and the common warning indicator to provide an output indication to the common warning indicator during said timing interval to indicate proper operation, but disconnecting said warning output indicator unless one of the transducers (11, 12) provides a "low pressure" signal.

11. System according to claim 10, further including a manual disconnect switch (20) coupled to the common warning indicator to disable operation thereof.

* * * * *